United States Patent [19]

Kuzuo et al.

[11] Patent Number: 5,006,388
[45] Date of Patent: Apr. 9, 1991

[54] MAGNETIC DISC

[75] Inventors: Ryuichi Kuzuo; Atsushi Kawamoto; Junya Tada; Kenji Ohmori; Hiroko Sekiya, all of Ichikawa, Japan

[73] Assignee: Sumitomo Metal Mining Company Limited, Tokyo, Japan

[21] Appl. No.: 227,800

[22] Filed: Aug. 3, 1988

[30] Foreign Application Priority Data

| Aug. 6, 1987 | [JP] | Japan | 62-195338 |
| Aug. 6, 1987 | [JP] | Japan | 62-195339 |
| Aug. 19, 1987 | [JP] | Japan | 62-204177 |
| Jul. 20, 1988 | [JP] | Japan | 63-179141 |

[51] Int. Cl.$^5$ ............................................. G11B 23/00
[52] U.S. Cl. ........................................ 428/64; 428/65; 428/611; 428/678; 428/694; 428/900
[58] Field of Search ............... 428/694, 900, 611, 678, 428/65, 64

[56] References Cited

U.S. PATENT DOCUMENTS

| 3,150,939 | 9/1964 | Wenner et al. | 428/900 |
| 4,226,681 | 10/1980 | Shirahata et al. | 427/131 |
| 4,552,820 | 11/1985 | Lin et al. | 428/611 |
| 4,631,202 | 12/1986 | Opfer et al. | 427/131 |

FOREIGN PATENT DOCUMENTS

| 58-204146 | 11/1983 | Japan . |
| 59-74606 | 4/1984 | Japan . |
| 60-83218 | 5/1985 | Japan . |

*Primary Examiner*—Paul J. Thibodeau
*Attorney, Agent, or Firm*—Watson, Cole, Grindle & Watson

[57] ABSTRACT

Disclosed are magnetic discs having (A) a Cr-layer, as a lower layer, which has a composition comprising (1) substantially Cr or (2) 10% by weight or less of one or more selected from Cu, Nb, Ti, V, Zr, Mo, Zn, W and Ta, and a balance of being substantially Cr, and (B) a magnetic recording medium layer, as an upper layer, which has a composition comprising (1) substantially Co, (2) 30% by weight or less of Ni and a balance of being substantially Co, (3) 10% by weight or less of one or more selected from Y, La, Ce, Pr, Nd, Sm, Gd, Tb and Dy, and a balance of being substantially Co, (4) 30% by weight or less of Ni, 10% by weight or less of one or more selected from Y, La, Ce, Pr, Nd, Sm, Gd, Tb and Dy, and a balance of being substantially Co, (5) 10% by weight or less of one or more selected from Cu, Nb, Ti, V, Cr, Zr, Mo, Zn, W and Ta, and a balance of being substantially Co, (6) 30% by weight or less of Ni, 10% by weight or less of one or more selected from Cu, Nb, Ti, V, Cr, Zr, Mo, Zn, W and Ta, and a balance of being substantially Co, (7) 10% by weight or less of one or more selected from Y, La, Ce, Pr, Nd, Sm, Gd, Tb and Dy, 10% by weight or less of one or more selected from Cu, Nb, Ti, V, Cr, Zr, Mo, Zn, W and Ta, and a balance of being substantially Co, or (8) 30% by weight or less of Ni, 10% by weight or less of one or more selected from Y, La, Ce, Pr, Nd, Sm, Gd, Tb and Dy, 10% by weight or less of one or more selected from Cu, Nb, Ti, V, Cr, Zr, Mo, Zn, W and Ta, and a balance of being substantially Co, both as formed on a non-magnetic substrate, except those where the lower layer has the composition (1) and the upper layer has the composition (1) or (2) as well as those where the lower layer has the composition (1) and the upper layer has the composition (5) or (6) containing only one or more of Cr, Ta and/or W. The magnetic discs have noticeably improved magnetic characteristics and/or corrosion-resistance.

4 Claims, No Drawings

MAGNETIC DISC

FIELD OF THE INVENTION

The present invention relates to magnetic discs and, more precisely, to those having noticeably improved magnetic characteristics, especially coercive force and/or corrosion-resistance.

BACKGROUND OF THE INVENTION

As magnetic discs such as floppy discs and hard discs, a blend obtained by kneading a magnetic powder such as $\gamma$-$Fe_2O_3$ or Fe and a synthetic resin binder is used to be coated on a non-magnetic substrate. In the magnetic layer of the magnetic disc of the type, however, since the proportion of the magnetic powder therein is small to be from 30 to 40% by volume, the saturated magnetic flux density is insufficient for a magnetic recording medium, which is therefore a bar to attainment of high density recording in the magnetic disc.

As opposed to the coated-type magnetic recording media of the said kind, magnetic recording media of a different kind, which have a thin magnetic metal film as formed on a non-magnetic substrate and which have a possibility of high density recording in the magnetic film, have been developed.

As means of forming the thin metal film-type magnetic recording medium of the said kind, (1) a chemical plating method as a wet-type method and (2) a sputtering method, an ion plating method or a vacuum evaporation plating method as a dry-type method have been employed. Regarding the chemical plating method (1), for example, a thin metal film medium such as Co-P or Co-Ni-P has been proposed. However, the method has various problems in the complication of the laminated structure of the films formed, the crush-resistance to head, the reliability such as error-characteristic and the stability in the formation of films. On the other hand, the dry-type method (2) has been proposed to overcome the said problems, and, for example, Co or Co-Ni has been investigated. However, when the film formed has hcp structure, the c-axis of the hcp structure, which is an easy magnetization axis, is apt to be oriented vertically to the film plane and the film is not suitable for an in-plane magnetic recording medium. In order to weaken the orientating property of the c-axis, addition of another element, for example, nitrogen (N) (JP-A-57-72307, the term "JP-A" as used herein means an "unexamined published Japanese patent application"), oxygen (O) (JP-A-60-163225), chromium (Cr) (Previous Papers for Applied Physics Associated Lecture, 1985, page 29, G-1 to 4, by Ishikawa, Tani, et al., Japan), tungusten (W) (R. D. Fisher, et al,; IEEE Trans. Magn., MAG-17, 3190 (1981)) or platinum (Pt) (J. A. Aboaf, et al.; IEEE Trans. Magn, MAG-19, 1514 (1983)), or formation of a laminated structure of CoNi/Cr or CoNiCr/Cr (Previous Papers for Applied Physics Associated Lecture, 1985, page 29, G-1 to 4, by Ishikawa, Tani, et al., Japan) has been proposed.

These magnetic recording media are extremely excellent in the magnetic characteristics such as saturated magnetic flux density, coercive force and squareness ratio.

However, in order to maintain the excellent coercive force of these media, the thickness of the Cr-layer of the said first layer is required to be increased. Therefore, a longer time is required for film formation and the producability is low. In addition, the surface property is worsened to cause deterioration of error characteristic and the like, and the reliability is often lowered. Moreover, these media have other problems that these are poor in the corrosion-resistance and the error characteristic thereof is often worsened.

SUMMARY OF THE INVENTION

The object of the present invention is to overcome the said problems in the prior art and to provide magnetic discs having noticeably improved magnetic characteristics and/or corrosion-resistance, as opposed to those formed by the above-mentioned conventional dry-type method.

In order to attain the said object, the present invention provides magnetic discs having (A) a Cr-layer, as a lower layer, which has a composition comprising (1) substantially Cr or (2) 10% by weight or less of one or more selected from Cu, Nb, Ti, V, Zr, Mo, Zn, W and Ta, and a balance of being substantially Cr, and (B) a magnetic recording medium layer, as an upper layer, which has a composition comprising (1) substantially Co, (2) 30% by weight or less of Ni and a balance of being substantially Co, (3) 10% by weight or less of one or more selected from Y, La, Ce, Pr, Nd, Sm, Gd, Tb and Dy, and a balance of being substantially Co, (4) 30% by weight or less of Ni, 10% by weight or less of one or more selected from Y, La, Ce, Pr, Nd, Sm, Gd, Tb and Dy, and a balance of being substantially Co, (5) 10% by weight or less of one or more selected from Cu, Nb, Ti, V, Cr, Zr, Mo, Zn, W and Ta, and a balance of being substantially Co, (6) 30% by weight or less of Ni, 10% by weight or less of one or more selected from Cu, Nb, Ti, V, Cr, Zr, Mo, Zn, W and Ta, and a balance of being substantially Co, (7) 10% by weight or less of one or more selected from Y, La, Ce, Pr, Nd, Sm, Gd, Tb and Dy, 10% by weight or less of one or more selected from Cu, Nb, Ti, V, Cr, Zr, Mo, Zn, W and Ta, and a balance of being substantially Co, or (8) 30% by weight or less of Ni, 10% by weight or less of one or more selected from Y, La, Ce, Pr, Nd, Sm, Gd, Tb and Dy, 10% by weight or less or one or more selected from Cu, Nb, Ti, V, Cr, Zr, Mo, Zn, W and Ta, and a balance of being substantially Co, both as formed on a non-magnetic substrate. However, the magnetic discs among them, where the lower layer has the composition (1) and the upper layer has the composition (1) or (2) as well as the lower layer has the composition (1) and the upper layer has the composition (5) or (6) containing only one or more of Cr, Ta and/or W, are outside the scope of the present invention.

DETAILED DESCRIPTION OF THE INVENTION

Now, the present invention will be explained in detail hereinafter.

The magnetic discs of the present invention have a Cr-layer as a lower layer and a Ni-Co or Co-magnetic recording medium layer as an upper layer, both as formed on a non-magnetic substrate.

As the non-magnetic substrate, Al, Al with Ni-P subbing layer, $Al_2O_3$, heat-resistant plastics and glass may be used.

The Cr-layer to be formed on the non-magnetic substrate as a lower layer has a composition comprising (1) substantially Cr or (2) 10% by weight or less of one or more ($M_1$) selected from Cu, Nb, Ti, V, Zr, Mo, Zn, W and Ta, and a balance of being substantially Cr. Because of the addition of $M_1$, magnetic discs having noticeably improved magnetic characteristics, especially coercive force, can be obtained. If the content of $M_1$ is more than 10% by weight, the coercive force of the resulting magnetic discs would lower. The effect could be presumed to be caused by the variation of the lattice constant of the Cr-layer because of the addition of $M_1$.

The magnetic recording medium film to be formed over the said Cr-layer as an upper layer comprises from 0 to 30% by weight of Ni, and 10% by weight or less of one or more (R) selected from Y, La, Ce, Pr, Nd, Sm, Gd, Tb and Dy and/or 10% by weight or less of one or more ($M_2$) selected from Cu, Nb, Ti, V, Cr, Zr, Mo, Zn, W and Ta, and a balance of being substantially Co. If the content of Ni is more than 30% by weight, the residual magnetization of the film would noticeably lower so that the electromagnetic transformation characteristic thereof would worsen. The element R is added so as to improve the coercive force and the corrosion-resistance of the film. If the content of R is more than 10% by weight, the coercive force and the saturation magnetization of the film would decrease and the corrosion-resistance thereof is apt to lower. In addition, the element $M_2$ is added so as to improve the coercive force of the magnetic recording medium film. This effect could be presumed to be caused by the segregation of $M_2$ in the grain boundary thereby to isolate the individual crystal grains from one another. If the content of $M_2$ is more than 10% by weight, the residual magnetization of the magnetic recording medium film would remarkably lower and the electromagnetic transformation characteristic thereof would thereby worsen. Because of the addition of both of these R and $M_2$, their effects could be synergified, whereby magnetic discs which are extremely excellent in both of the magnetic characteristics and the corrosion-resistance can be obtained. The thickness of the said film is desired to be from 0.01 to 0.15 $\mu$m. If the thickness is less than 0.01 $\mu$m, any sufficient power of reproduction could not be obtained, and if it is more than 0.15 $\mu$m, the decrease of the coercive force would be remarkable.

In the magnetic discs of the present invention, a protective film, such as $SiO_2$ or carbon film, is desired to be formed on the said magnetic recording medium film, so as to improve the abrasion-resistance to head.

In accordance with the present invention, the films of the lower layer and the upper layer may be formed by sputtering method, vacuum evaporation plating method or ion plating method.

The following examples are intended to illustrate the present invention in more detail but not to limit it in any way. Examples of conventional samples have also been mentioned below, for comparison.

EXAMPLES AND COMPARATIVE EXAMPLES

A Cr-layer having the composition and thickness as indicated in Tables 1 through 15 below, as a lower layer, and a 500 Å thick magnetic recording medium film having the composition as indicated in the same Tables, as an upper layer, were formed on a 1.5 mm thick aluminium (Al) substrate having a Ni-P subbing layer as coated, by the use of a magnetron sputtering device, whereupon the film formation condition was in every case as mentioned below.

| | |
|---|---|
| Final Vacuum Degree | $2 \times 10^{-5}$ to $8 \times 10^{-5}$ Pa |
| Sputtering Gas (Ar) Pressure | 0.4 to 1.2 Pa |
| Sputtering Electric Power | 200 to 600 W |
| Target Diameter | 15 cm |
| Target-Substrate Distance | 100 to 150 mm |

Each of the thus prepared disc samples was cut and subjected to composition analysis and evaluation of magnetic characteristics and corrosion-resistance. For the composition analysis, both EPMA analysis and chemical analysis were performed, and the magnetic characteristics were measured by the use of a vibrating sample type magnetometer. For evaluation of the corrosion-resistance, each disc sample was dipped in an aqueous 1N-NaCl solution at 25° C. and the ratio of the saturation magnetization of the disc after dipping to that of the same disc before dipping was calculated.

The results obtained were shown in Tables 1 through 15 below, wherein Tables 1 to 14 indicate the examples of the present invention and Table 15 indicates an example of the conventional sample.

TABLE 1

| | Cr Layer (balance Cr) | | Magnetic Recording Medium Film (balance Co) | | Magnetic Characteristics | | Corrosion-resistance (Ratio of saturation magnetization Ms after test to that before test) | |
|---|---|---|---|---|---|---|---|---|
| Sample No. | Element Added: wt. % | Layer Thickness (Å) | Ni (wt. %) | Element Added: wt. % | Coercive Force Hc (Oe) | Saturation Magnetization Ms (Gauss) | Test Period (hr) | Ratio |
| 1-1 | — | 3000 | 12 | Y:5 | 780 | 7900 | 100 | 0.91 |
| 1-2 | " | " | 20 | Ce:3 | 850 | 9800 | " | 0.85 |
| 1-3 | " | " | 10 | Pr:1 | 890 | 9200 | " | 0.85 |
| 1-4 | " | " | 25 | Pr:3 | 830 | 10800 | " | 0.88 |
| 1-5 | " | " | 23 | Pr:5 | 800 | 10500 | " | 0.82 |
| 1-6 | " | " | 8 | Nd:2 | 740 | 11100 | " | 0.90 |
| 1-7 | " | " | 28 | Sm:1 | 920 | 8900 | " | 0.80 |
| 1-8 | " | " | 22 | Gd:9 | 1000 | 9400 | " | 0.86 |
| 1-9 | " | " | 27 | Dy:5 | 960 | 9500 | " | 0.90 |
| 1-10 | " | " | 22 | Tb:7 | 840 | 8900 | " | 0.82 |

TABLE 2

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film (balance Co) Element Added: wt. % | Magnetic Characteristics Coercive Force Hc (Oe) | Magnetic Characteristics Saturation Magnetization Ms (Gauss) | Corrosion-resistance (Ratio of saturation magnetization Ms after test to that before test) Test Period (hr) | Corrosion-resistance Ratio |
|---|---|---|---|---|---|---|---|---|
| 2-1 | — | 3000 | — | Y:4 | 580 | 11500 | 100 | 0.77 |
| 2-2 | " | " | " | La:5 | 700 | 11200 | " | 0.79 |
| 2-3 | " | " | " | Ce:4 | 700 | 11300 | " | 0.69 |
| 2-4 | " | " | " | Pr:2 | 710 | 10900 | " | 0.71 |
| 2-5 | " | " | " | Pr:4 | 740 | 11400 | " | 0.73 |
| 2-6 | " | " | " | Pr:6 | 730 | 11600 | " | 0.72 |
| 2-7 | " | " | " | Pr:8 | 690 | 10800 | " | 0.72 |
| 2-8 | " | " | " | Pr:10 | 530 | 11600 | " | 0.71 |
| 2-9 | " | " | " | Nd:5 | 540 | 11000 | " | 0.79 |
| 2-10 | " | " | " | Sm:4 | 750 | 11600 | " | 0.80 |
| 2-11 | " | " | " | Gd:5 | 730 | 11700 | " | 0.78 |
| 2-12 | " | " | " | Tb:6 | 680 | 11700 | " | 0.69 |
| 2-13 | " | " | " | Dy:5 | 660 | 11200 | " | 0.73 |

TABLE 3

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film (balance Co) Element Added: wt. % | Magnetic Characteristics Coercive Force Hc (Oe) | Magnetic Characteristics Saturation Magnetization Ms (Gauss) | Corrosion-resistance Test Period (hr) | Corrosion-resistance Ratio |
|---|---|---|---|---|---|---|---|---|
| 3-1 | Nb:2.5 | 3000 | 20 | Pr:2 | 950 | 12800 | 100 | 0.82 |
| 3-2 | " | " | " | Pr:4 | 1080 | 12800 | " | 0.81 |
| 3-3 | Nb:3 | " | " | Nd:2 | 880 | 13000 | — | — |
| 3-4 | " | " | " | Nd:4 | 920 | 13100 | 100 | 0.85 |
| 3-5 | " | " | " | Nd:6 | 990 | 13000 | — | — |
| 3-6 | " | " | " | Nd:8 | 1080 | 12800 | 100 | 0.80 |
| 3-7 | " | " | " | Nd:9 | 1070 | 12700 | — | — |
| 3-8 | " | " | " | Nd:10 | 920 | 12400 | — | — |
| 3-9 | Nb:4 | " | " | Pr:2 | 900 | 13100 | — | — |
| 3-10 | " | " | " | Pr:4 | 1050 | 13000 | — | — |
| 3-11 | " | " | " | Pr:8 | 1070 | 12800 | 50 | 0.92 |
| 3-12 | " | " | " | " | 1070 | 12800 | 100 | 0.85 |
| 3-13 | " | " | " | " | " | 12800 | 170 | 0.82 |
| 3-14 | Nb:4 | 3000 | 20 | Pr:8 | 1070 | 12800 | 190 | 0.75 |
| 3-15 | " | " | " | " | " | " | 220 | 0.62 |
| 3-16 | " | " | " | Sm:2 | 890 | — | 100 | — |
| 3-17 | " | " | " | Sm:4 | 930 | — | " | 0.82 |
| 3-18 | " | " | " | Sm:6 | 1000 | — | " | 0.80 |
| 3-19 | " | " | " | Sm:8 | 1050 | — | " | — |
| 3-20 | " | " | " | Sm:10 | 900 | — | " | — |
| 3-21 | Nb:4.5 | " | " | Pr:4 | 1130 | 13000 | " | 0.75 |
| 3-22 | Nb:6 | " | " | Pr:2 | 940 | — | — | — |
| 3-23 | Ti:3 | " | " | Gd:5 | 990 | 13100 | 100 | 0.77 |
| 3-24 | " | " | " | Dy:5 | 1070 | 12800 | 100 | 0.82 |
| 3-25 | V:3 | " | " | La:5 | 1000 | 13000 | 100 | 0.81 |
| 3-26 | " | " | " | Ce:5 | 1010 | 12700 | " | 0.82 |
| 3-27 | V:3 | 3000 | 20 | Sm:5 | 1040 | 13300 | 100 | 0.85 |
| 3-28 | Zr:3 | " | " | Pr:5 | 970 | 13200 | " | 0.82 |
| 3-29 | Mo:3 | " | " | Nd:6 | 1200 | 13300 | " | 0.70 |
| 3-30 | " | " | " | Sm:4 | 1150 | 13500 | " | 0.85 |
| 3-31 | " | " | " | Sm:6 | 1110 | 13000 | " | 0.80 |
| 3-32 | Zn:3 | " | " | Y:5 | 980 | 12900 | " | 0.78 |
| 3-33 | Nb:4 | " | " | Tb:4 | 940 | 12900 | " | 0.81 |
| 3-34 | " | " | " | Tb:8 | 1010 | 12600 | " | 0.84 |

TABLE 4

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film (balance Co) Element Added: wt. % | Magnetic Characteristics Coercive Force Hc (Oe) | Magnetic Characteristics Saturation Magnetization Ms (Gauss) | Corrosion-resistance Test Period (hr) | Corrosion-resistance Ratio |
|---|---|---|---|---|---|---|---|---|
| 4-1 | Cu:4 | 3000 | — | Sm:6 | 660 | 10500 | 100 | 0.78 |
| 4-2 | Nb:4 | " | " | Y:5 | 690 | 11600 | " | 0.79 |
| 4-3 | Nb:4 | " | " | La:6 | 710 | 10600 | " | 0.71 |
| 4-4 | Nb:4 | " | " | Ce:4 | 720 | 11400 | " | 0.75 |
| 4-5 | Nb:4 | " | " | Pr:2 | 760 | 10300 | — | — |
| 4-6 | Nb:5 | " | " | Pr:4 | 810 | 11400 | 100 | 0.74 |

TABLE 4-continued

| | Cr Layer (balance Cr) | | Magnetic Recording Medium Film (balance Co) | | Magnetic Characteristics | | Corrosion-resistance (Ratio of saturation magnetization Ms after test to that before test) | |
|---|---|---|---|---|---|---|---|---|
| Sample No. | Element Added: wt. % | Layer Thickness (Å) | Ni (wt. %) | Element Added: wt. % | Coercive Force Hc (Oe) | Saturation Magnetization Ms (Gauss) | Test Period (hr) | Ratio |
| 4-7 | Nb:4 | " | " | Pr:8 | 730 | 10700 | — | — |
| 4-8 | Nb:5 | " | " | Nd:5 | 790 | 10400 | 100 | 0.69 |
| 4-9 | Nb:4 | " | " | Sm:2 | 790 | 11400 | — | — |
| 4-10 | Nb:4 | " | " | Sm:6 | 820 | 11400 | 100 | 0.74 |
| 4-11 | Nb:5 | " | " | Sm:9 | 730 | 11800 | — | — |
| 4-12 | Nb:4 | " | " | Gd:6 | 800 | 10300 | 100 | 0.78 |
| 4-13 | Nb:4 | " | " | Tb:4 | 730 | 10900 | " | 0.76 |
| 4-14 | Nb:4 | 3000 | — | Dy:6 | 740 | 11800 | 100 | 0.78 |
| 4-15 | Ti:4 | " | " | Sm:6 | 800 | 10800 | — | — |
| 4-16 | V:3 | " | " | Sm:5 | 790 | 10400 | — | — |
| 4-17 | Zr:3 | " | " | Sm:6 | 730 | 11000 | — | — |
| 4-18 | Mo:4 | " | " | Sm:7 | 720 | 11900 | — | — |
| 4-19 | Zn:3 | " | " | Sm:6 | 780 | 12000 | — | — |
| 4-20 | W:3 | " | " | Pr:6 | 750 | 11600 | — | — |
| 4-21 | W:3 | " | " | Nd:6 | 750 | 10300 | — | — |
| 4-22 | W:3 | " | " | Sm:7 | 810 | 11700 | — | — |
| 4-23 | Ta:3 | " | " | Sm:6 | 740 | 11500 | — | — |

TABLE 5

| | Cr Layer (balance Cr) | | Magnetic Recording Medium Film (balance Co) | | Magnetic Characteristics | | Corrosion-resistance (Ratio of saturation magnetization Ms after test to that before test) | |
|---|---|---|---|---|---|---|---|---|
| Sample No. | Element Added: wt. % | Layer Thickness (Å) | Ni (wt. %) | Element Added: wt. % | Coercive Force Hc (Oe) | Saturation Magnetization Ms (Gauss) | Test Period (hr) | Ratio |
| 5-1 | — | 3000 | 20 | Cu:2 | 970 | 12100 | — | — |
| 5-2 | " | " | " | Cu:8 | 1100 | 12200 | " | " |
| 5-3 | " | " | " | Nb:8 | 1120 | 13100 | " | " |
| 5-4 | " | " | " | Ti:2 | 920 | 12400 | " | " |
| 5-5 | " | " | " | Ti:7 | 1040 | 13100 | " | " |
| 5-6 | " | " | " | V:7 | 1120 | 13500 | " | " |
| 5-7 | " | " | " | Zr:8 | 1080 | 13400 | " | " |
| 5-8 | " | " | " | Mo:2 | 890 | 12800 | " | " |
| 5-9 | " | " | " | Mo:8 | 1160 | 12900 | " | " |
| 5-10 | " | " | " | Mo:10 | 1140 | 13000 | " | " |

TABLE 6

| | Cr Layer (balance Cr) | | Magnetic Recording Medium Film (balance Co) | | Magnetic Characteristics | | Corrosion-resistance (Ratio of saturation magnetization Ms after test to that before test) | |
|---|---|---|---|---|---|---|---|---|
| Sample No. | Element Added: wt. % | Layer Thickness (Å) | Ni (wt. %) | Element Added: wt. % | Coercive Force Hc (Oe) | Saturation Magnetization Ms (Gauss) | Test Period (hr) | Ratio |
| 6-1 | — | 3000 | — | Cu:7 | 770 | 13000 | — | — |
| 6-2 | " | " | " | Nb:8 | 810 | 12100 | " | " |
| 6-3 | " | " | " | Ti:2 | 790 | 10800 | " | " |
| 6-4 | " | " | " | Ti:8 | 770 | 10900 | " | " |
| 6-5 | " | " | " | V:2 | 800 | 11300 | " | " |
| 6-6 | " | " | " | V:7 | 780 | 12300 | " | " |
| 6-7 | " | " | " | Cr:2 | 690 | 12400 | " | " |
| 6-8 | " | " | " | Cr:4 | 770 | 12300 | " | " |
| 6-9 | " | 500 | " | Cr:8 | 670 | 12600 | " | " |
| 6-10 | " | 1000 | " | Cr:8 | 710 | 12800 | " | " |
| 6-11 | " | 3000 | " | Cr:8 | 830 | 12700 | " | " |
| 6-12 | " | " | " | Zr:7 | 800 | 12700 | " | " |
| 6-13 | " | " | " | Mo:2 | 760 | 12400 | " | " |
| 6-14 | — | 3000 | — | Mo:8 | 780 | 12100 | — | — |
| 6-15 | " | " | " | Zn:8 | 750 | 11000 | " | " |
| 6-16 | " | " | " | W:2 | 710 | 11900 | " | " |
| 6-17 | " | " | " | W:7 | 790 | 12700 | " | " |
| 6-18 | " | " | " | Ta:2 | 680 | 12600 | " | " |
| 6-19 | " | " | " | Ta:8 | 780 | 12400 | " | " |

TABLE 7

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film Element Added: wt. % | Magnetic Characteristics Coercive Force Hc (Oe) | Magnetic Characteristics Saturation Magnetization Ms (Gauss) | Corrosion-resistance (Ratio of saturation magnetization Ms after test to that before test) Test Period (hr) | Ratio |
|---|---|---|---|---|---|---|---|---|
| 7-1 | Cu: 2 | 500 | 20 | Cr: 6 | 980 | 12700 | — | — |
| 7-2 | Cu: 4 | " | " | Cr: 6 | 1050 | 12900 | 100 | 0.89 |
| 7-3 | Cu: 8 | " | " | Cr: 7 | 1030 | 13100 | — | — |
| 7-4 | Nb: 2 | " | " | Ti: 7 | 920 | 12700 | — | — |
| 7-5 | Nb: 3 | " | " | Ti: 6 | 1010 | 13200 | 100 | 0.87 |
| 7-6 | Nb: 8 | " | " | Ti: 6 | 1000 | 12700 | — | — |
| 7-7 | Nb: 2 | " | " | Cr: 7 | 990 | 13400 | — | — |
| 7-8 | Nb: 4 | " | " | Cr: 7 | 1130 | 13300 | 100 | 0.88 |
| 7-9 | Nb: 8 | " | " | Cr: 7 | 1080 | 12700 | — | — |
| 7-10 | Nb: 4 | 1000 | " | Cr: 6 | 1210 | 12400 | — | — |
| 7-11 | " | 2000 | " | Cr: 7 | 1280 | 13800 | — | — |
| 7-12 | " | 3000 | " | Cr: 7 | 1320 | 13700 | — | — |
| 7-13 | Nb: 2 | 500 | " | Mo: 7 | 960 | 13100 | — | — |
| 7-14 | Nb: 4 | 500 | 20 | Mo: 6 | 1080 | 13500 | 100 | 0.88 |
| 7-15 | Nb: 8 | " | " | Mo: 7 | 1040 | 13200 | — | — |
| 7-16 | Nb: 4 | " | " | W: 7 | 1120 | 13300 | 100 | 0.84 |
| 7-17 | Nb: 8 | " | " | W: 7 | 1090 | 12900 | — | — |
| 7-18 | Nb: 4 | " | " | Ta: 7 | 1180 | 12600 | 100 | 0.81 |
| 7 19 | Nb: 8 | " | " | Ta: 6 | 1100 | 135600 | — | — |
| 7-20 | Ti: 2 | " | " | Cr: 7 | 960 | 13000 | — | — |
| 7-21 | Ti: 4 | " | " | Cr: 8 | 1050 | 12600 | 100 | 0.90 |
| 7-22 | Ti: 8 | " | " | Cr: 7 | 980 | 13000 | — | — |
| 7-23 | Ti: 4 | 1000 | " | Cr: 7 | 1110 | 13400 | — | — |
| 7-24 | Ti: 4 | 500 | " | W: 7 | 1060 | 12400 | 100 | 0.84 |
| 7-25 | Ti: 8 | " | " | W: 7 | 1040 | 13100 | — | — |
| 7-26 | Ti: 4 | " | " | Ta: 7 | 1110 | 12600 | 100 | 0.87 |
| 7-27 | Ti: 8 | 500 | 20 | Ta: 7 | 1030 | 13000 | — | — |
| 7 28 | V: 2 | " | " | Cr: 6 | 890 | 13700 | — | — |
| 7-29 | V: 4 | " | " | Cr: 7 | 1010 | 13600 | 100 | 0.89 |
| 7-30 | V: 8 | " | " | Cr: 7 | 980 | 12900 | — | — |
| 7-31 | Zr: 4 | " | " | Cr: 6 | 1040 | 12500 | 100 | 0.89 |
| 7-32 | Zr: 7 | " | " | Cr: 6 | 1010 | 13600 | — | — |
| 7-33 | Mo: 4 | " | " | Cr: 7 | 1130 | 13200 | 100 | 0.87 |
| 7-34 | Mo: 8 | " | " | Cr: 6 | 1060 | 12700 | — | — |
| 7-35 | Zn: 4 | " | " | Cr: 7 | 1150 | 13500 | 100 | 0.89 |
| 7-36 | Zn: 9 | " | " | Cr: 8 | 1010 | 13300 | — | — |
| 7-37 | W: 4 | " | " | Cr: 7 | 1160 | 12400 | 100 | 0.90 |
| 7-38 | W: 8 | " | " | Cr: 6 | 1100 | 13600 | — | — |
| 7-39 | W: 2 | " | " | W: 6 | 940 | 12800 | — | — |
| 7-40 | W: 4 | 500 | 20 | W: 6 | 970 | 13300 | 100 | 0.84 |
| 7-41 | W: 9 | " | " | W: 6 | 960 | 13400 | — | — |
| 7-42 | Ta: 4 | " | " | Cr: 7 | 1090 | 12500 | 100 | 0.88 |
| 7-43 | Ta: 8 | " | " | Cr: 6 | 1090 | 12900 | — | — |
| 7-44 | Ta: 5 | " | " | Ta: 7 | 1060 | 13500 | 100 | 0.85 |
| 7-45 | Ta: 8 | " | " | Ta: 7 | 1040 | 13400 | — | — |
| 7-46 | Nb: 2 | " | " | Cu: 7 | 980 | 13400 | — | — |
| 7-47 | Nb: 4 | " | " | Cu: 7 | 1010 | 12800 | 100 | 0.86 |
| 7-48 | Nb: 8 | " | " | Cu: 7 | 1030 | 13500 | — | — |
| 7-49 | Nb: 4 | " | " | Nb: 7 | 1050 | 12700 | 100 | 0.84 |
| 7-50 | Nb: 2 | " | " | V: 7 | 970 | 13000 | — | — |
| 7-51 | Nb: 4 | " | " | V: 6 | 1060 | 13100 | 100 | 0.88 |
| 7-53 | Nb: 4 | " | " | Zr: 6 | 1050 | 13500 | 100 | 0.84 |

TABLE 8

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film Element Added: wt. % | Magnetic Characteristics Coercive Force Hc (Oe) | Magnetic Characteristics Saturation Magnetization Ms (Gauss) | Corrosion-resistance (Ratio of saturation magnetization Ms after test to that before test) Test Period (hr) | Ratio |
|---|---|---|---|---|---|---|---|---|
| 8-1 | Cu: 2 | 500 | — | Cr: 6 | 670 | 12800 | — | — |
| 8-2 | Cu: 5 | " | " | Cr: 6 | 710 | 12400 | " | " |
| 8-3 | Cu: 8 | " | " | Cr: 6 | 700 | 12400 | " | " |
| 8-4 | Nb: 4 | " | " | Cu: 6 | 790 | 12500 | " | " |
| 8-5 | Nb: 4 | " | " | Nb: 7 | 840 | 11500 | " | " |
| 8-6 | Nb: 4 | " | " | Ti: 6 | 810 | 11900 | " | " |
| 8-7 | Nb: 4 | " | " | V: 6 | 810 | 12100 | " | " |
| 8-8 | Nb: 2 | " | " | Cr: 6 | 720 | 11500 | " | " |
| 8-9 | Nb: 4 | " | " | Cr: 6 | 770 | 11700 | " | " |
| 8-10 | Nb: 8 | " | " | Cr: 7 | 710 | 12800 | " | " |
| 8-11 | Nb: 4 | 1000 | " | Cr: 6 | 820 | 11400 | " | " |
| 8-12 | " | 2000 | " | Cr: 6 | 850 | 12500 | " | " |

TABLE 8-continued

| | Cr Layer (balance Cr) | | Magnetic Recording Medium Film (balance Co) | | Magnetic Characteristics | | Corrosion-resistance (Ratio of saturation magnetization Ms after test to that before test) | |
|---|---|---|---|---|---|---|---|---|
| Sample No. | Element Added: wt. % | Layer Thickness (Å) | Ni (wt. %) | Element Added: wt. % | Coercive Force Hc (Oe) | Saturation Magnetization Ms (Gauss) | Test Period (hr) | Ratio |
| 8-13 | " | 3000 | " | Cr: 6 | 910 | 12800 | " | " |
| 8-14 | Nb: 4 | 500 | — | Zr: 6 | 820 | 11700 | — | — |
| 8-15 | Nb: 4 | " | " | Mo: 7 | 790 | 12000 | " | " |
| 8-16 | Nb: 4 | " | " | Zn: 7 | 800 | 11500 | " | " |
| 8-17 | Nb: 2 | " | " | W: 6 | 720 | 12400 | " | " |
| 8-18 | Nb: 5 | " | " | W: 7 | 790 | 11300 | " | " |
| 8-19 | Nb: 8 | " | " | W: 7 | 750 | 11900 | " | " |
| 8-20 | Nb: 2 | " | " | Ta: 7 | 740 | 11200 | " | " |
| 8-21 | Nb: 4 | " | " | Ta: 6 | 830 | 11400 | " | " |
| 8-22 | Nb: 8 | " | " | Ta: 7 | 780 | 12800 | " | " |
| 8-23 | Ti: 4 | " | " | Cr: 6 | 770 | 11900 | " | " |
| 8-24 | Ti: 4 | 500 | " | W: 7 | 800 | 12000 | " | " |
| 8-25 | Ti: 4 | " | " | Ta: 7 | 780 | 11400 | " | " |
| 8-26 | V: 5 | " | " | Cr: 6 | 750 | 12400 | " | " |
| 8-27 | Zr: 5 | 500 | — | Cr: 6 | 780 | 11700 | — | — |
| 8-28 | Mo: 5 | " | " | Cr: 6 | 740 | 12100 | " | " |
| 8-29 | Mo: 4 | " | " | W: 7 | 810 | 11600 | " | " |
| 8-30 | Mo: 5 | " | " | Ta: 6 | 790 | 11900 | " | " |
| 8-31 | Zn: 6 | " | " | Cr: 6 | 790 | 12800 | " | " |
| 8-32 | W: 5 | " | " | Cr: 6 | 800 | 11300 | " | " |

TABLE 9

| | Cr Layer (balance Cr) | | Magnetic Recording Medium Film (balance Co) | | Magnetic Characteristics | | (Corrosion-resistance (Ratio of saturation magnetization Ms after test to that before test) | |
|---|---|---|---|---|---|---|---|---|
| Sample No. | Element Added: wt. % | Layer Thickness (Å) | Ni (wt. %) | Element Added: wt. % | Coercive Force Hc (Oe) | Saturation Magnetization Ms (Gauss) | Test Period (hr) | Ratio |
| 9-1 | — | 3000 | 27 | Cr: 5, Y: 7 | 1290 | 13200 | 100 | 0.94 |
| 9-2 | " | " | 28 | Cr: 5, La: 7 | 1280 | 13300 | " | 0.98 |
| 9-3 | " | " | 28 | Cr: 4, Ce: 7 | 1350 | 13900 | " | 0.96 |
| 9-4 | " | 1000 | 27 | Cr: 5, Ce: 7 | 1320 | 13000 | " | 0.96 |
| 9-5 | " | 3000 | 25 | Cr: 5, Pr: 3 | 1210 | 13500 | " | 0.94 |
| 9-6 | " | " | 25 | Cr: 5, Pr: 6 | 1390 | 13900 | " | 0.97 |
| 9-7 | " | " | 26 | Cr: 6, Nd: 3 | 1310 | 12800 | " | 0.94 |
| 9-8 | " | " | 25 | Cr: 5, Nd: 6 | 1360 | 13800 | " | 0.98 |
| 9-9 | " | 500 | 28 | Cr: 5, Sm: 4 | 1350 | 13000 | " | 0.96 |
| 9-10 | " | " | 27 | Cr: 5, Sm: 7 | 1250 | 13400 | " | 0.98 |
| 9-11 | " | 1000 | 28 | Cr: 5, Sm: 4 | 1400 | 12800 | " | 0.95 |
| 9-12 | " | " | 27 | Cr: 5, Sm: 7 | 1320 | 13700 | " | 0.99 |
| 9-13 | " | " | 25 | Cr: 4, Sm: 10 | 1200 | 13600 | " | 0.97 |
| 9-14 | — | 3000 | 28 | Cr: 5, Sm: 4 | 1470 | 12900 | 100 | 0.97 |
| 9-15 | " | " | 26 | Cr: 5, Gd: 7 | 1190 | 13700 | " | 0.91 |
| 9-16 | " | " | 25 | Cr: 4, Tb: 7 | 1240 | 13600 | " | 0.93 |
| 9-17 | " | " | 26 | Cr: 5, Dy: 7 | 1250 | 12900 | " | 0.93 |
| 9-18 | " | 1000 | 23 | Mo: 5, Ce: 7 | 1180 | 12300 | — | — |
| 9-19 | " | 3000 | 24 | Mo: 4, Ce: 7 | 1320 | 12200 | " | " |
| 9-20 | " | " | 28 | Mo: 5, Pr: 3 | 1300 | 12600 | " | " |
| 9-21 | " | " | 25 | Mo: 5, Pr: 6 | 1290 | 13300 | " | " |
| 9-22 | " | " | 29 | Mo: 5, Nd: 3 | 1310 | 13500 | " | " |
| 9-23 | " | 1000 | 26 | Mo: 5, Sm: 3 | 1270 | 12500 | " | " |
| 9-24 | " | " | 25 | Mo: 4, Sm: 7 | 1310 | 13200 | " | " |
| 9-25 | " | 3000 | 29 | Mo: 5, Sm: 4 | 1380 | 12800 | " | " |
| 9-26 | " | " | 26 | Mo: 5, Sm: 7 | 1410 | 12300 | " | " |
| 9-27 | — | 3000 | 28 | W: 5, Pr: 3 | 1320 | 12200 | — | — |
| 9-28 | " | " | 23 | W: 4, Pr: 7 | 1390 | 13500 | " | " |
| 9-29 | " | " | 27 | W: 5, Nd: 4 | 1330 | 12900 | " | " |
| 9-30 | " | " | 27 | W; 6, Sm: 3 | 1410 | 12500 | " | " |
| 9-31 | " | " | 26 | Ta: 5, Pr: 3 | 1370 | 13700 | 100 | 0.92 |
| 9-32 | " | " | 25 | Ta: 5, Pr: 7 | 1380 | 12900 | " | 0.97 |
| 9-33 | " | 1000 | 26 | Ta: 4, Nd: 4 | 1210 | 12400 | " | 0.93 |
| 9-34 | " | 3000 | 26 | Ta: 5, Nd: 4 | 1320 | 13100 | " | 0.94 |
| 9-35 | " | " | 26 | Ta: 5, Nd: 7 | 1380 | 13500 | " | 0.97 |
| 9-36 | " | 1000 | 27 | Ta: 6, Sm: 3 | 1300 | 12500 | " | 0.91 |
| 9-37 | " | " | 24 | Ta: 4, Sm: 7 | 1380 | 13100 | " | 0.96 |
| 9-38 | " | 3000 | 28 | Ta: 5, Sm: 3 | 1370 | 13900 | " | 0.94 |
| 9-39 | " | " | 25 | Ta: 5, Sm: 7 | 1420 | 13600 | " | 0.98 |

TABLE 10

| Sample No. | Cr Layer (balance Cr) Element Added: wt. % | Cr Layer Layer Thickness () | Magnetic Recording Medium Film (balance Co) Ni (wt. %) | Magnetic Recording Medium Film (balance Co) Element Added: wt. % | Magnetic Characteristics Coercive Force Hc (Oe) | Magnetic Characteristics Saturation Magnetization Ms (Gauss) | Corrosion-resistance (Ratio of saturation magnetization Ms after test to that before test) Test Period (hr) | Corrosion-resistance Ratio |
|---|---|---|---|---|---|---|---|---|
| 10-1 | — | 3000 | — | Cr:5, Y:7 | 820 | 10100 | 100 | 0.78 |
| 10-2 | — | " | — | Cr:5, La:7 | 880 | 9900 | " | 0.68 |
| 10-3 | — | 1000 | — | Cr:4, Ce:7 | 760 | 9700 | " | 0.70 |
| 10-4 | — | 3000 | — | Cr:5, Ce:7 | 810 | 10400 | " | 0.74 |
| 10-5 | — | 1000 | — | Cr:5, Pr:6 | 770 | 10500 | " | 0.63 |
| 10-6 | — | 3000 | — | Cr:5, Pr:7 | 820 | 9800 | " | 0.77 |
| 10-7 | — | 1000 | — | Cr:4, Nd:7 | 790 | 10000 | " | 0.68 |
| 10-8 | — | 3000 | — | Cr:5, Nd:7 | 860 | 9700 | " | 0.70 |
| 10-9 | — | 500 | — | Cr:6, Sm:6 | 710 | 10300 | " | 0.69 |
| 10-10 | — | 1000 | — | Cr:5, Sm:7 | 800 | 9100 | " | 0.76 |
| 10-11 | — | 3000 | — | Cr:4, Sm:7 | 890 | 10500 | " | 0.68 |
| 10-12 | — | " | — | Cr:5, Gd:7 | 820 | 9800 | " | 0.71 |
| 10-13 | — | " | — | Cr:5, Tb:7 | 830 | 9100 | " | 0.74 |
| 10-14 | — | " | — | Cr:5, Dy:6 | 810 | 10400 | " | 0.64 |
| 10-15 | — | " | — | Mo:5, Pr:7 | 850 | 9600 | " | 0.66 |
| 10-16 | — | " | — | Mo:4, Nd:7 | 800 | 9500 | " | 0.74 |
| 10-17 | — | " | — | Mo:5, Sm:6 | 790 | 10200 | " | 0.73 |
| 10-18 | — | 500 | — | W:5, Pr:7 | 720 | 9200 | " | 0.64 |
| 10-19 | — | 1000 | — | W:5, Pr:7 | 760 | 10400 | " | 0.78 |
| 10-20 | — | 3000 | — | W:4, Pr:7 | 820 | 9400 | " | 0.63 |
| 10-21 | — | " | — | Ta:5, Nd:6 | 830 | 10200 | " | 0.79 |
| 10-22 | — | 1000 | — | Ta:5, Sm:7 | 710 | 9300 | " | 0.72 |
| 10-23 | — | 3000 | — | Ta:5, Sm:7 | 750 | 10100 | " | 0.79 |

TABLE 11

| Sample No. | Cr Layer (balance Cr) Element Added: wt. % | Cr Layer Layer Thickness () | Magnetic Recording Medium Film (balance Co) Ni (wt. %) | Magnetic Recording Medium Film (balance Co) Element Added: wt. % | Magnetic Characteristics Coercive Force Hc (Oe) | Magnetic Characteristics Saturation Magnetization Ms (Gauss) | Corrosion-resistance Test Period (hr) | Corrosion-resistance Ratio |
|---|---|---|---|---|---|---|---|---|
| 11-1 | Cu:3 | 500 | 24 | Cr:5, Pr:7 | 1350 | 13200 | 100 | 0.91 |
| 11-2 | Nb:4 | " | 26 | Cr:4, Y:7 | 1320 | 12100 | " | 0.93 |
| 11-3 | Nb:4 | " | 27 | Cr:6, La:6 | 1340 | 12500 | " | 0.91 |
| 11-4 | Nb:4 | " | 25 | Cr:6, Ce:6 | 1410 | 12900 | " | 0.91 |
| 11-5 | Nb:4 | " | 26 | Cr:5, Nd:2 | 1350 | 12600 | — | — |
| 11-6 | Nb:5 | " | 27 | Cr:4, Nd:4 | 1430 | 13600 | 100 | 0.89 |
| 11-7 | Nb:4 | " | 27 | Cr:4, Sm:2 | 1420 | 12600 | — | — |
| 11-8 | Nb:4 | " | 26 | Cr:4, Sm:4 | 1520 | 12400 | 100 | 0.98 |
| 11-9 | Nb:4 | " | 25 | Cr:4, Sm:8 | 1480 | 12300 | — | — |
| 11-10 | Nb:5 | " | 26 | Cr:6, Gd:8 | 1230 | 13000 | 100 | 0.97 |
| 11-11 | Nb:4 | " | 25 | Cr:4, Tb:7 | 1360 | 13000 | " | 0.92 |
| 11-12 | Nb:5 | " | 26 | Cr:6, Dy:8 | 1290 | 13800 | " | 0.93 |
| 11-13 | Nb:5 | " | 26 | Mo:5, Pr:6 | 1330 | 12900 | — | — |
| 11-14 | Nb:4 | " | 27 | Mo:5, Nd:6 | 1320 | 13800 | — | — |
| 11-15 | Nb:4 | " | 26 | Mo:6, Sm:7 | 1300 | 13400 | — | — |
| 11-16 | Nb:4 | " | 25 | W:5, Pr:2 | 1320 | 12900 | — | — |
| 11-17 | Nb:5 | " | 27 | W:5, Pr:4 | 1390 | 13000 | 100 | 0.94 |
| 11-18 | Nb:5 | " | 26 | W:5, Pr:8 | 1340 | 12800 | — | — |
| 11-19 | Nb:6 | " | 25 | W:5, Sm:2 | 1400 | 12900 | — | — |
| 11-20 | Nb:5 | " | 27 | W:5, Sm:8 | 1410 | 12400 | 100 | 0.96 |
| 11-21 | Nb:4 | " | 25 | Ta:6, Nd:7 | 1390 | 13200 | — | — |
| 11-22 | Nb:5 | " | 26 | Ta:6, Sm:2 | 1280 | 12300 | — | — |
| 11-23 | Nb:5 | " | 25 | Ta:6, Sm:4 | 1310 | 13100 | 100 | 0.91 |
| 11-24 | Nb:5 | " | 26 | Ta:6, Sm:6 | 1390 | 13200 | " | 0.92 |
| 11-25 | Nb:4 | " | 27 | Ta:6, Sm:9 | 1380 | 12200 | — | — |
| 11-26 | Ti:5 | " | 25 | Cr:4, Pr:6 | 1370 | 13100 | — | — |
| 11-27 | Ti:5 | " | 27 | Cr:4, Sm:7 | 1490 | 12600 | — | — |
| 11-28 | V:6 | " | 26 | Cr:5, Pr:7 | 1480 | 12700 | — | — |
| 11-29 | Zr:6 | " | 27 | Cr:4, Sm:7 | 1480 | 12800 | — | — |
| 11-30 | Mo:5 | " | 26 | Cr:5, Sm:6 | 1390 | 13600 | — | — |
| 11-31 | W:5 | " | 24 | Cr:5, Pr:7 | 1290 | 13200 | — | — |
| 11-32 | W:5 | " | 27 | Cr:5, Nd:7 | 1310 | 13100 | — | — |
| 11-33 | Ta:6 | " | 27 | Cr:4, Sm:7 | 1510 | 12900 | — | — |

TABLE 12

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film (balance Co) Element Added: wt. % | Magnetic Characteristics Coercive Force Hc (Oe) | Magnetic Characteristics Saturation Magnetization Ms (Gauss) | Corrosion-resistance (Ratio of saturation magnetization Ms after test to that before test) Test Period (hr) | Corrosion-resistance Ratio |
|---|---|---|---|---|---|---|---|---|
| 12-1 | Cu:4 | 500 | — | Cr:5, Pr:7 | 810 | 10500 | 100 | 0.79 |
| 12-2 | Nb:4 | " | — | Cr:4, Y:6 | 860 | 8900 | " | 0.78 |
| 12-3 | Nb:4 | " | — | Cr:5, La:7 | 840 | 10800 | " | 0.76 |
| 12-4 | Nb:4 | " | — | Cr:5, Ce:7 | 800 | 10600 | " | 0.74 |
| 12-5 | Nb:5 | " | — | Cr:6, Nd:6 | 730 | 9800 | " | 0.80 |
| 12-6 | Nb:4 | " | — | Cr:4, Sm:6 | 850 | 8800 | " | 0.75 |
| 12-7 | Nb:4 | " | — | Cr:4, Gd:7 | 780 | 9800 | " | 0.69 |
| 12-8 | Nb:6 | " | — | Cr:5, Tb:7 | 830 | 10700 | " | 0.71 |
| 12-9 | Nb:4 | " | — | Cr:4, Dy:7 | 880 | 10400 | " | 0.72 |
| 12-10 | Nb:4 | " | — | Mo:5, Pr:7 | 840 | 8900 | " | 0.69 |
| 12-11 | Nb:5 | " | — | Mo:4, Nd:6 | 740 | 10800 | " | 0.77 |
| 12-12 | Nb:4 | " | — | Mo:6, Sm:7 | 880 | 10200 | " | 0.68 |
| 12-13 | Nb:4 | " | — | W:5, Pr:7 | 720 | 9700 | " | 0.73 |
| 12-14 | Nb:5 | " | — | W:5, Sm:6 | 870 | 10100 | " | 0.76 |
| 12-15 | Nb:4 | " | — | Ta:4, Nd:7 | 760 | 10700 | " | 0.78 |
| 12-16 | Nb:4 | " | — | Ta:4, Sm:7 | 800 | 9500 | " | 0.72 |
| 12-17 | Ti:4 | " | — | Cr:4, Sm:6 | 770 | 10800 | — | — |
| 12-18 | V:4 | " | — | Cr:5, Pr:7 | 730 | 9400 | — | — |
| 12-19 | Zr:5 | " | — | Cr:5, Sm:7 | 830 | 8900 | — | — |
| 12-20 | Mo:5 | " | — | Cr:4, Sm:7 | 810 | 10100 | — | — |
| 12-21 | W:6 | " | — | Cr:4, Pr:8 | 820 | 9100 | — | — |
| 12-22 | W:4 | " | — | Cr:5, Nd:7 | 840 | 8800 | — | — |
| 12-23 | Ta:5 | " | — | Cr:5, Sm:6 | 820 | 10100 | — | — |

TABLE 13

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film (balance Co) Element Added: wt. % | Magnetic Characteristics Coercive Force Hc (Oe) | Magnetic Characteristics Saturation Magnetization Ms (Gauss) | Corrosion-resistance Test Period (hr) | Corrosion-resistance Ratio |
|---|---|---|---|---|---|---|---|---|
| 13-1 | Nb:0.6 | 1000 | 20 | — | 550 | 13200 | — | — |
| 13-2 | Nb:1.2 | " | " | — | 740 | 13300 | — | — |
| 13-3 | Nb:2.5 | 500 | " | — | 630 | 13200 | — | — |
| 13-4 | Nb:2.5 | 1000 | " | — | 900 | 13000 | — | — |
| 13-5 | Nb:2.5 | 2000 | " | — | 960 | 13100 | — | — |
| 13-6 | Nb:2.5 | 3000 | " | — | 900 | 13300 | — | — |
| 13-7 | Nb:2.5 | 4000 | " | — | 840 | 12800 | — | — |
| 13-8 | Nb:2.5 | 5000 | " | — | 710 | 12900 | — | — |
| 13-9 | Nb:3.5 | 1000 | " | — | 940 | 13100 | — | — |
| 13-10 | Nb:4.8 | " | " | — | 920 | 12900 | — | — |
| 13-11 | Nb:5.2 | " | " | — | 820 | 13000 | — | — |
| 13-12 | Nb:7.5 | " | " | — | 700 | 12700 | — | — |
| 13-13 | Nb:8.6 | " | " | — | 550 | 12700 | — | — |
| 13-14 | Ti:2.5 | " | " | — | 550 | 13400 | — | — |
| 13-15 | Ti:4.0 | " | " | — | 620 | 13400 | — | — |
| 13-16 | Ti:5.5 | " | " | — | 620 | 13200 | — | — |
| 13-17 | Ti:7.0 | " | " | — | 540 | 13400 | — | — |
| 13-18 | V:2.5 | " | " | — | 550 | 13400 | — | — |
| 13-19 | V:4.0 | " | " | — | 720 | 13000 | — | — |
| 13-20 | V:5.5 | " | " | — | 640 | 13200 | — | — |
| 13-21 | V:7.0 | " | " | — | 500 | 12900 | — | — |
| 13-22 | Zr:1.0 | " | " | — | 580 | 13200 | — | — |
| 13-23 | Zr:1.5 | " | " | — | 740 | 13000 | — | — |
| 13-24 | Zr:2.5 | " | " | — | 820 | 12500 | — | — |
| 13-25 | Zr:4.5 | " | " | — | 750 | 13300 | — | — |
| 13-26 | Zr:5.2 | " | " | — | 650 | 13200 | — | — |
| 13-27 | Zr:6.2 | " | " | — | 500 | 13100 | — | — |
| 13-28 | Mo:1.0 | " | " | — | 560 | 13000 | — | — |
| 13-29 | Mo:2.5 | " | " | — | 750 | 13100 | — | — |
| 13-30 | Mo:3.8 | " | " | — | 780 | 12900 | — | — |
| 13-31 | Mo:5.6 | " | " | — | 750 | 13300 | — | — |
| 13-32 | Mo:7.0 | " | " | — | 620 | 13000 | — | — |
| 13-33 | Zn:2.0 | " | " | — | 470 | 13400 | — | — |
| 13-34 | Zn:4.0 | " | " | — | 530 | 13200 | — | — |
| 13-35 | Zn:6.0 | " | " | — | 540 | 12800 | — | — |

TABLE 14

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film Element Added: wt. % | Magnetic Characteristics Coercive Force Hc (Oe) | Magnetic Characteristics Saturation Magnetization Ms (Gauss) | Corrosion-resistance (Ratio of saturation magnetization Ms after test to that before test) Test Period (hr) | Corrosion-resistance Ratio |
|---|---|---|---|---|---|---|---|---|
| 14-1 | Nb:1.2 | 1000 | — | — | 430 | 12300 | — | — |
| 14-2 | Nb:2.5 | 500 | — | — | 680 | 12900 | — | — |
| 14-3 | Nb:2.5 | 1000 | — | — | 820 | 12100 | — | — |
| 14-4 | Nb:2.5 | 2000 | — | — | 860 | 12600 | — | — |
| 14-5 | Nb:2.5 | 3000 | — | — | 840 | 12400 | — | — |
| 14-6 | Nb:2.5 | 4000 | — | — | 810 | 12700 | — | — |
| 14-7 | Nb:2.5 | 5000 | — | — | 850 | 13100 | — | — |
| 14-8 | Nb:4.9 | 1000 | — | — | 680 | 12100 | — | — |
| 14-9 | Nb:7.2 | " | — | — | 610 | 12900 | — | — |
| 14-10 | Ti:2.4 | " | — | — | 450 | 13200 | — | — |
| 14-11 | Ti:6.8 | " | — | — | 480 | 12800 | — | — |
| 14-12 | V:3.0 | " | — | — | 510 | 12600 | — | — |
| 14-13 | V:7.0 | " | — | — | 480 | 12000 | — | — |
| 14-14 | Zr:2.8 | " | — | — | 710 | 13100 | — | — |
| 14-15 | Mo:3.1 | " | — | — | 690 | 12500 | — | — |
| 14-16 | Mo:6.4 | " | — | — | 600 | 12700 | — | — |
| 14-17 | Zn:3.2 | " | — | — | 440 | 12800 | — | — |
| 14-18 | Ta:2.8 | " | — | — | 510 | 12500 | — | — |
| 14-19 | W:2.6 | " | — | — | 520 | 13000 | — | — |

TABLE 15

| Sample No. | Cr Layer (balance Cr) Element Added: wt. % | Cr Layer Layer Thickness (Å) | Magnetic Recording Medium Film (balance Co) Ni (wt. %) | Magnetic Recording Medium Film Element Added: wt. % | Magnetic Characteristics Coercive Force Hc (Oe) | Magnetic Characteristics Saturation Magnetization Ms (Gauss) | Corrosion-resistance Test Period (hr) | Corrosion-resistance Ratio |
|---|---|---|---|---|---|---|---|---|
| 15-1 | — | 3000 | 5 | — | 680 | 8600 | 100 | 0.73 |
| 15-2 | " | " | 25 | " | 710 | 9000 | " | 0.69 |
| 15-3 | " | 500 | 20 | " | 150 | 14000 | — | — |
| 15-4 | " | 1000 | " | " | 250 | 13500 | " | " |
| 15-5 | " | 2000 | " | " | 440 | 13300 | " | " |
| 15-6 | " | 3000 | " | " | 620 | 13700 | 30 | 0.90 |
| 15-7 | " | " | " | " | " | " | 50 | 0.75 |
| 15-8 | " | " | " | " | " | " | 100 | 0.65 |
| 15-9 | " | " | " | " | " | " | 150 | 0.30 |
| 15-10 | " | 4000 | " | " | 770 | 12800 | — | — |
| 15-11 | " | 5000 | " | " | 860 | 13000 | " | " |
| 15-12 | " | 6000 | " | " | 920 | 13600 | " | " |

As apparent from the previous description, the present invention provides magnetic discs having noticeably improved magnetic characteristics and/or corrosion-resistance as opposed to conventional Co-Ni type magnetic discs.

While the invention has been described in detail and with reference to sepcific embodiments thereof, it will be apparent to one skilled in the art that various changes and modifications can be made therein without departing from the spirit and scope thereof.

What is claimed is:

1. A magnetic disc having (a) a lower layer and (b) a magnetic recording medium film as an upper layer, as formed on a non-magnetic substrate, wherein;

(a) the lower layer consists essentially of Cr and 0.6 to 10% by weight of at least one element selected from the group consisting of Cu, Nb, Ti, V, Zr, Mo, Zn, W and Ta; and (b) the upper layer comprises Co.

2. A magnetic disc as claimed in claim 1, wherein said upper layer further contains up to 30% by weight of Ni.

3. A magnetic disc having (a) a lower layer and (b) a magnetic recording medium film as an upper layer, as formed on a non-magnetic substrate, wherein;

(a) the lower layer consists essentially of Cr and 0.6 to 10% by weight of at least one element selected from the group consisting of Cu, Nb, Ti, V, Zr, Mo, Zn, W and Ta; and (b) the upper layer consists essentially of Co and up to 10% by weight of at least one element selected from Y, La, Ce, Pr, Nd, Sm, Gd, Tb and Dy and/or up to 10% by weight of at least one element selected from the group consisting of Cu, Nb, Ti, V, Cr, Zr, Mo, Zn, W and Ta.

4. A magnetic disc as claimed in claim 3, wherein said upper layer further contains up to 30% by weight of Ni.

* * * * *